Sept. 30, 1958  C. M. LEE  2,853,925
REVERSIBLE LENS ATTACHMENT MOUNTING MEANS
Filed Dec. 14, 1956
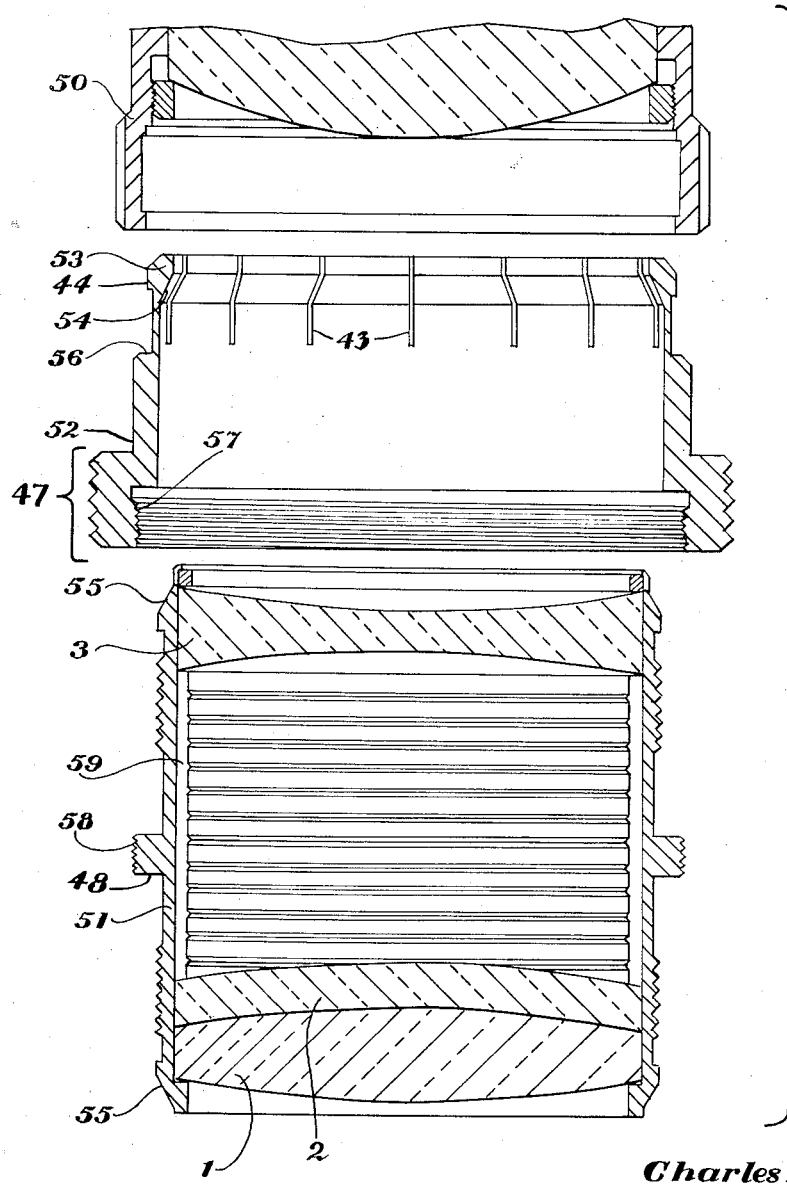
Charles M. Lee
INVENTOR.
BY
ATTORNEY & AGENT United States Patent Office 2,853,925
Patented Sept. 30, 1958

2,853,925
REVERSIBLE LENS ATTACHMENT MOUNTING MEANS

Charles M. Lee, Rochester, N. Y., assignor to Eastman Kodak Company, Rochester, N. Y., a corporation of New Jersey Application December 14, 1956, Serial No. 628,443

1 Claim. (Cl. 88—57)

This invention relates to reversible attachments for photographic objectives and particularly to reversible lens converters, by which is meant afocal magnifying attachments which are attachable to the front of the objective and form a combination having a longer or a shorter focal length than the objective alone according to which way the converter is turned.

The object of the invention is to provide a mount for a reversible lens attachment which is easily and quickly attachable to and detachable from the front of the objective and which holds the optical elements of the attachment in accurate optical alignment with the objective.

Lens converters, also called magnifying or telephoto attachments if they produce a longer focal length, or wide-angle or minifying attachments if they produce a shorter focal length, generally comprise a positive member and a negative member axially aligned and optically separated by the difference of their equivalent focal lengths to render the attachment afocal. When the positive member is to the front, the attachment operates as a telephoto attachment, and when the negative member is to the front, it operates as a wide-angle attachment. Heretofore it has been customary to design such an attachment for use exclusively either as a telephoto attachment or as a wide-angle attachment, although it has been known theoretically that such attachments can be reversed in position, in which case the magnification is the reciprocal of that in the normal position, but it has been generally considered that the aberrations of such a reversible system are too serious to make it practical. The mounts which have been suggested for such reversible attachments have been nothing more than schematic diagrams showing the attachment sliding into a tube attached to the front of the objective.

In a co-pending application Serial No. 613,110 filed September 20, 1956, my colleague Willy E. Schade, has shown a reversible lens converter which has proven highly satisfactory for use on amateur motion-picture cameras and projectors.

The present invention provides a superior means of reversibly mounting lens converters of this type and may also be used for other lens attachments such as reversible dichroic color filters.

According to the invention, there is provided in combination a ring or collet which fits into the forward end of the tube of predetermined diameter of a standard objective mount and a cylindrical barrel adapted to hold the optical elements of the lens attachment in axial alignment and spaced apart, one element at each end of the barrel, and also adapted to screw into the collet and expand it into locking relationship with the front of the objective mount. The rear end of the collet is made up with an expandable portion, usually by cutting about a dozen slots a few millimeters into the edge of the collet around the circumference thereof. This expandable portion is provided with a bead on the outside which is adapted to grip the inside of the forwardly extending tube of the standard objective mount and is provided on the inner surface with a tapered or conical portion which tapers toward the slotted end of the collet. The front end of the collet is internally threaded and the length of the collet is slightly more than half the length of the barrel in which the optical elements of the attachment are mounted. The barrel of the attachment co-operating therewith is provided with an externally threaded portion at the center mating with the internally threaded portion of the collet and each end of the attachment barrel is provided with an external conical portion tapering toward the end of the barrel and matching the internal conical surface of the collet. In operation, the collet is pushed into the opening in the forwardly extending tube of the standard objective mount until a shoulder provided for the purpose rests against the front of said tube and provides positive alignment with the objective. The barrel of the lens attachment is then pushed into the collet until the two mating threaded portions begin to engage and then is screwed into the collet, forcing the tapered portion of the end of the barrel into engagement with the internally tapered portion of the collet, thus expanding the expandable portion of the collet so that the bead thereon is driven into tight engagement with the internal surface of the forwardly extending tube of the standard lens mount or barrel. It is convenient and in fact almost necessary to have a knurled area or the like on the collet ring so that it can be held with one hand while the attachment barrel is screwed into it with the other.

The invention has several outstanding advantages. The most important of these is that it permits fastening the lens attachment onto already existing lens barrels without any mechanical modification of the latter. A second advantage is that the same lens attachment mounted in the same barrel can be used on different standard objective mounts, which are already in existence and which have slightly different internal diameters, by making up only one special part, namely the collet ring, for each of the different standard lens barrels. A third advantage is that the appropriate label can be put on each half of the attachment barrel, for example, "telephoto attachment" on the appropriate end of the barrel and "wide angle attachment" on the other end of the barrel, and then whichever label is not appropriate is concealed by the collet ring when the attachment is screwed thereinto.

In the accompanying drawing, the single figure shows in axial section a lens attachment according to the invention with the parts removed from one another.

In this drawing the front of a standard objective is shown fragmentarily at the top of the sheet with a forwardly extending tube 50 as is customary on camera objectives for protecting the glass and providing a small degree of shading from the sun. The parts of a lens attachment according to the invention are shown ready for assembly and attachment onto the objective tube 50 in the telephoto position, the front of the attachment being at the bottom of the sheet. These parts include a collet ring 52 and a lens barrel 51 of the attachment proper. The collet ring 52 is provided with the expandable portion 53, which is made expandable by being slotted with slots 43 and which is provided with a beading 44 on the outside and is provided with an inwardly tapering bore 54 near the end thereof. The collet ring is slid into the lens tube 50 until the shoulder 56 rests against the front of the latter at which time it is ready to receive the barrel 51 of the attachment proper.

The lens converter barrel 51 supports the optical elements 1, 2, 3 axially aligned therein and held apart by a spacing ring 59 in the customary fashion. This attachment barrel 51 is provided with a conical taper 55 at each end thereof which matches the internal taper 54 of the collet ring and with a band 48 of greater diameter around the middle provided with threads 58 which match the internal threads 57 at the front of the collet ring. In operation, the collet ring is pushed into the front of the lens barrel 50 until the shoulder 56 rests against the front thereof as above described and is held with one hand by the portion of larger diameter 47 which may be knurled. The appropriate end of the lens attachment is then pushed into the collet ring with the other hand until the threads 58 begin to engage the internal threads 57 and then the lens attachment barrel is screwed in on the threads 57, 58 until the tapered portion 55 is pushed against and along the internally tapered portion 54 of the collet ring enough to expand the beading 44 outwardly into tightly gripping contact with the internal face of the lens barrel 50. The attachment is thus accurately positioned and firmly attached to the main lens and can easily be detached by unscrewing and quickly attached with the other end forward by screwing in the other end.

I claim:

A reversible mount for reversibly attaching an optical lens attachment onto the front end of a lens tube of predetermined internal diameter comprising in combination a collet ring having a slotted and expandable portion at one end thereof adapted to fit into said lens tube, a conically tapered internal surface area within said expandable portion, an external shoulder approximately midway along the length of the collet adapted to fit against the end of said lens tube, a front knurled portion of larger diameter than the rest of the collet ring, and internal threads at the front end of the collet ring, and in combination therewith a lens attachment barrel and a positive component and a negative component supported in axial alignment in said barrel, said lens attachment barrel being provided with a circumferential portion of larger diameter around the middle thereof, externally threaded to mate with the internal threads of the collet ring, and being provided at each end thereof with a tapered conical portion matching the internally tapered portion of the collet ring whereby when the collet ring is inserted into the front of the lens tube against said shoulder and the lens attachment barrel is inserted into the lens collet ring and screwed up tight on said mating threads the externally tapered portion of the lens attachment barrel engages the internally tapered portion of the collet ring and expands the slotted portion of the latter into firm contact with the internal face of the lens tube for holding the lens attachment firmly in coaxial spaced relation with the objective.

References Cited in the file of this patent

UNITED STATES PATENTS

| | | |
|---|---|---|
| 983,047 | Grant | Jan. 31, 1911 |
| 1,980,147 | Wolfe | Nov. 6, 1934 |
| 2,184,018 | Ort | Dec. 19, 1939 |
| 2,401,367 | Nagel | June 4, 1946 |

FOREIGN PATENTS

| | | |
|---|---|---|
| 722,817 | France | Jan. 5, 1932 |
| 730,867 | France | May 23, 1932 |
| 604,133 | Great Britain | June 29, 1948 |